US009245024B1

(12) United States Patent
Jacobsson et al.

(10) Patent No.: US 9,245,024 B1
(45) Date of Patent: Jan. 26, 2016

(54) CONTEXTUAL-BASED SERVING OF CONTENT SEGMENTS IN A VIDEO DELIVERY SYSTEM

(71) Applicant: Google Inc., Mountain View, CA (US)

(72) Inventors: Per Jacobsson, Los Angeles, CA (US); Nathan Hunt, Playa Vista, CA (US)

(73) Assignee: Google Inc., Mountain View, CA (US)

( * ) Notice: Subject to any disclaimer, the term of this patent is extended or adjusted under 35 U.S.C. 154(b) by 245 days.

(21) Appl. No.: 13/745,472

(22) Filed: Jan. 18, 2013

(51) Int. Cl.
*G06F 17/30* (2006.01)

(52) U.S. Cl.
CPC .............................. *G06F 17/30864* (2013.01)

(58) Field of Classification Search
None
See application file for complete search history.

(56) References Cited

U.S. PATENT DOCUMENTS

| 6,606,644 | B1  |   | 8/2003  | Ford et al.                  |
|-----------|-----|---|---------|------------------------------|
| 8,086,725 | B1  | * | 12/2011 | Liang et al. ......... 709/224 |
| 8,122,014 | B2  | * | 2/2012  | Brindley et al. ....... 707/722 |
| 8,209,333 | B2  |   | 6/2012  | Hubbard et al.               |
| 8,356,035 | B1  | * | 1/2013  | Baluja et al. ......... 707/741 |
| 2004/0068697 | A1 | * | 4/2004 | Harik et al. ........ 715/513 |
| 2008/0066107 | A1 | * | 3/2008 | Moonka et al. ....... 725/42 |
| 2009/0006375 | A1 | * | 1/2009 | Lax et al. .............. 707/5 |
| 2009/0119169 | A1 | * | 5/2009 | Chandratillake et al. ... 705/14 |
| 2009/0148045 | A1 | * | 6/2009 | Lee et al. ............ 382/190 |
| 2009/0192896 | A1 |   | 7/2009 | Newton et al.                |
| 2011/0004525 | A2 | * | 1/2011 | Byrne ............... 705/14.67 |
| 2011/0029384 | A1 |   | 2/2011 | Wei et al.                   |
| 2011/0078753 | A1 | * | 3/2011 | Christianson et al. ..... 725/109 |
| 2011/0179357 | A1 | * | 7/2011 | Lin et al. ............ 715/733 |
| 2011/0213655 | A1 |   | 9/2011 | Henkin et al.                |
| 2013/0013583 | A1 | * | 1/2013 | Yu et al. ............. 707/709 |
| 2014/0012859 | A1 | * | 1/2014 | Heilprin et al. ........ 707/748 |

* cited by examiner

*Primary Examiner* — Jay Morrison
(74) *Attorney, Agent, or Firm* — Foley & Lardner LLP; John D. Lanza

(57) ABSTRACT

A method, implemented on a processor, provides content segments to a first resource, the first resource having a first video. The method includes identifying and extracting contextual information from one or more second resources, the second resources having one or more associated second videos; processing the extracted contextual information in relation to a set of criteria, the set of criteria based on a content of the first video; selecting one or more content segments based on the set of criteria; and providing, to the first resource one or more of the selected content segments to be displayed with the first video.

20 Claims, 9 Drawing Sheets

CONTEXTUAL-BASED SERVING OF CONTENT SEGMENTS IN A VIDEO DELIVERY SYSTEM

BACKGROUND

The Internet has become a popular medium for delivery, viewing, and sharing of videos. Many Web sites are devoted to video viewing and sharing. These Web sites may also provide content segments, other than the videos, to be viewed by customers that visit the Web sites to acquire, view, and share videos. The content segments may be intended to relate in some fashion to the content of the videos. In some circumstances, the content of a Web page providing a video may be examined to help determine the subject matter of the video. However, information derived from the Web page content may not be sufficient to accurately determine the video's topic.

SUMMARY

A method, implemented on a processor, provides content segments to a first resource, the first resource having an associated first video. The method includes identifying contextual information from one or more second resources, the second resources having one or more associated second videos; processing the extracted contextual information in relation to a set of criteria, the set of criteria based on a content of the first video; selecting one or more content segments based on the set of criteria; and providing, to the first resource one or more of the selected content segments to be displayed with the first video.

A system for contextual-based serving of content segments at a first resource of a video delivery system includes a processor; and a computer-readable storage medium having encoded thereon a program of instructions executed by the processor. The processor extracts contextual information from second resources having embedded video segments; compares the extracted contextual information to a set of criteria, the set of criteria based on a content of the video, for serving a content segment with the video at the first resource; selects one or more content segments matching the set of criteria; and serves one or more of the selected content segments at the resource displaying the video.

A processor-implemented method for improving serving of advertisements at first Web sites displaying videos includes crawling second Web sites including comments with embedded videos, wherein a video embedded in a comment corresponds to a video displayed at one of the first Web sites; extracting contextual information from the comments; determining a set of advertisements based on the extracted contextual information; and serving an advertisement from the set of advertisements with a display of the video at a first Web site.

DESCRIPTION OF THE DRAWINGS

The detailed description refers to the following figures in which like numerals refer to like items, and in which.

DETAILED DESCRIPTION

Figure 1:
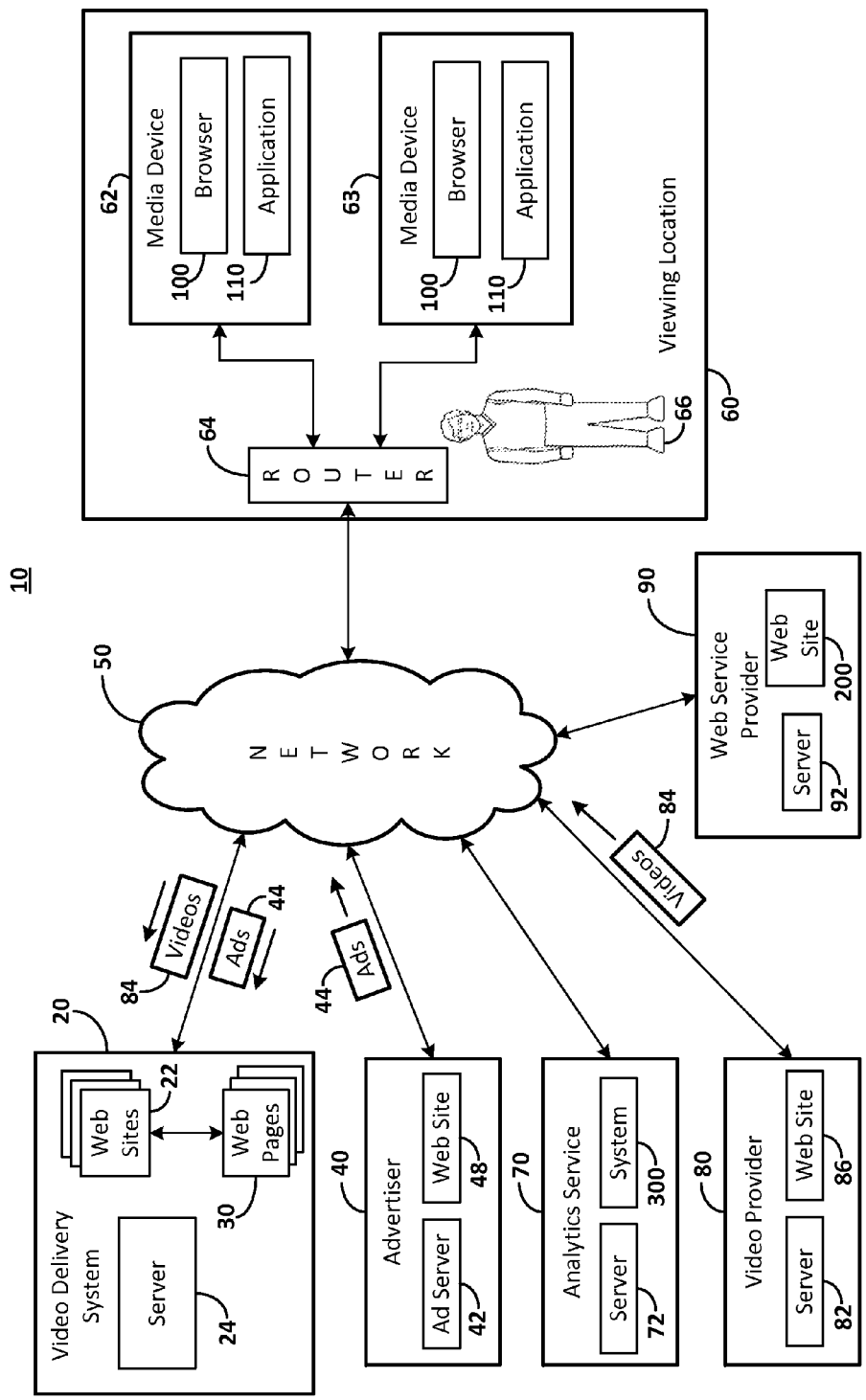
FIG. 1 illustrates an environment that supports improved contextual serving of content segments in a video delivery system.

Video delivery systems may deliver or make videos available on Internet Web sites. The Web sites may provide other content segments to be viewed by customers who visit the Web sites to acquire, view, and share videos. The other content segments may be developed and produce to convey a specific message to the customers. The other content segments may be tied to or relate in some fashion to the content of the Web page on which a video is made available and/or to the video itself. However, data derived from the Web page content may not be sufficient to accurately determine the video's topic. Thus, the other content segments served on a video delivery system Web page may not be effective in conveying their intended messages.

To overcome this and related problems, disclosed herein are systems and methods for contextual-based serving of content segments in a video delivery system. The video display system may embed videos on Web pages that are generated by and under control of the video display system. In an embodiment, the systems are used to collect data from third-party Web pages that also embed the same videos as those provided through the video delivery system. The systems may employ, for example, a Web crawler that scans Internet Web pages to find third-party Web pages that also embed the same videos as those on the video delivery system's Web pages. One means for detection may be to identify third-party Web pages that use the same video embedding mechanism as used by the video delivery system. An example of such a third-party Web page allows users to provide comments directed to specific videos. The herein disclosed systems then may use an aggregate of the data extracted from the scanned third-party Web pages to provide contextual-based serving of content segments on the video delivery system Web pages and thereby improve the relevance of the served content segments.

One third-party Web site "type" used by the herein disclosed systems and methods to improve the contextual serving of content segments in a video delivery system is commonly referred to a blog site or simply a blog. The term "blog" is a portmanteau of Web log. Generally, a blog is a discussion or informational site that includes a string of discrete entries or posts that typically are displayed in reverse chronological order. Blogs may be the work of an individual or a small group. Other blogs are generated by professional organizations, government organizations, commercial enterprises, news and media organizations, and other large entities. Some blogs have a central theme. Some blogs are akin to social networks. Some Web sites include blog sections on their Web pages. A person who posts a comment on a blog site may be referred to as a blogger.

The herein disclosed systems may operate under the assumption that when a blogger posts a comment with an embedded video, the content of the comment is relevant to the content of the video. The comment may contain information (e.g., keywords) that may be extracted and analyzed, and used subsequently to improve serving of content segments on a Web page of a video delivery system.

In an embodiment, the content segments are advertisements or other marketing devices. The advertisements may be static or non-static, and may include text, images, video, audio, and animation.

The processes executed by the herein disclosed systems may involve use of information that in some respect identifies a device the viewer uses to access the television programming. For example, when a viewer uses an Internet browser to access a Web site, a Web server may create a random identification (ID) that identifies the browser and may cause the random ID to be stored on the viewer's device.

In situations in which the systems disclosed herein collect personal information about viewers, or may make use of personal information, the viewers may be provided with an opportunity to control whether programs or features collect viewer information (e.g., information about a viewer's social network, social actions or activities, profession, a viewer's preferences, or a viewer's current location), or to control whether and/or how to receive advertisements from an ad server that may be more relevant or of interest to the viewer. In addition, certain data may be treated in one or more ways before it is stored or used, so that personally identifiable information is removed. For example, a viewer's identity may be treated so that no personally identifiable information can be determined for the viewer, or a viewer's geographic location may be generalized where location information is obtained (such as to a city, ZIP code, or state level), so that a particular location of a viewer cannot be determined. Thus, the viewer controls how information is collected about the viewer and used by a server.

FIG. 1 illustrates an environment in which improved contextual serving of advertisements may be implemented for a video display system. In FIG. 1, environment 10 includes video delivery system 20, advertiser 40, viewing location 60, analytics service 70, video provider 80, and Web site provider 90, all of which communicate over network 50. Although FIG. 1 shows these entities as separate and apart, at least some of the entities may be combined or related. For example, the video delivery system 20 and analytics service 70 may be part of a single entity. Other combinations of entities are possible.

The video delivery system 20 operates video Web sites 22. The Web sites 22 are hosted on Web server 24. A Web site 22 includes Web pages 30. The Web site 22 may include Internet search features that allow viewers to search for video content displayed by the Web server 24 on the Web pages 30. The Web pages 30 may display search results, content segments such as advertisements, and other information. The Web server 24 may provide links to enable navigation among the Web pages 30. The Web server 24 also may display, on any of the Web pages 30, links to other Web sites. The Web site 22 may display videos created and provided by advertiser 40, viewer 66, video provider 80, and other entities. The Web server 24 may incorporate components of a content segment selection system that improves contextual serving of advertisements on the Web pages 30. The components of the content segment selection system are described with respect to FIG. 3. As an alternative to hosting on the Web server 24, at least some components of the content segment selection system may be implemented at another back-end server such as at the analytics service 70.

The Web pages 30 may display search results in response to a search query submitted by the viewer 66. For example, a Web page 30 may display several videos that satisfy a search query. Each such video may be assigned a unique identification (ID). Two or more of the videos may be related. For example, a movie trailer may come in two versions, a short version and a long version, and the two movie trailers may, therefore be related though a mechanism provided by the movie's producer. While each trailer has its own unique ID, the linking mechanism relates the two trailers. The Web pages 30 also may display one or more content segments, or advertisements. The viewer 66 may be more interested in the displayed advertisements when the displayed advertisements have some relationship to the content of the videos appearing on the Web page 30. That is, serving of advertisements on a video Web page 30 may be improved when the advertisements are served based on the content of the videos. In an embodiment, the herein disclosed systems and methods use contextual information derived from other Web sites, in particular blog sites that allow and have videos embedded with blog posts. For example, advertisements for polar bear tours in Churchill, Manitoba may be more appropriate when served with videos about Arctic life than with videos about the Amazon.

The advertiser 40 operates ad server 42 to provide advertisements 44 (i.e., content segments) that are served at the Web pages 30. The advertiser 40 may represent a single company or entity, a group of related companies, or a group of unrelated companies (e.g., the advertiser 40 may operate as an ad broker). In an embodiment, the advertiser 40 and the video delivery system 20 are part of the same entity. The advertiser 40 may operate the ad server 42 to provide one or more Web sites 48. The advertisements 44 provided for display on the Web pages 30 may be static advertisements or non-static advertisements. The advertisements 44 may include audio, video, and animation features. The advertisements 44 may be in a rich media format. The advertiser 40 may provide an advertising campaign that includes both static and non-static advertising. The static advertisements and non-static advertisements may complement each other; that is, the static advertisements and the non-static advertisements may be related to the same product or service. The advertisements 44 may be displayed on a Web page 30 at the same time that a video is being displayed on the Web page 30. The advertisements 44 may be shown as a video overlay of a video, before and/or after display of a video, and during pauses in a video. The advertisements 44 may be served in specific locations of the Web page 30 while the video is displayed in a different location of the Web page 30. The advertisements 44 may change during display of a video.

The advertisements 44 may include links to other Web pages and other Web sites, including Web sites 48. For example, an advertisement for a car may include a link to a car manufacturer's Web site. A viewer viewing a video at the Web site 22 may "click" on the advertisement and be redirected to the car manufacturer's Web site 48.

The network 50 may be any communications network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless.

The viewing location 60 may be the residence of an individual viewer, such as viewer 66, who operates media devices 62 and 63 to access, through router 64, resources such as the Web sites 20. The media devices 62 and 63 may be fixed or mobile. For example, media device 62 may be an Internet connected "smart" television (ITV); a "basic" or "smart" television connected to a set top box (STB) or other Internet-enabled device; a Blu-Ray™ player; a game box; and a radio, for example. Media device 63 may be a tablet, a smart phone, a laptop computer, or a desk top computer, for example. The media devices 62 and 63 may include browsers, such as browser 100. The browser 100 may be a software application for retrieving, presenting, and traversing resources such as at the Web site 22. A resource may be identified by a Uniform Resource Locator (URL) and may be a Web page, image, video, or other content. The URL may allow the browser 100 to connect to the Web site 22. Hyperlinks present in resources enable the viewer 66 to navigate the browser 100 to related resources. The viewer 66 may operate the browser 100 to search for Web sites related to specific topics or to search for a specific Web site by URL. The media devices 62 and 63 also may include applications 110. The viewer 66 may cause the media devices 62 or 63 to execute an application 110, such as a mobile banking application, to access online banking services. The application 110 may involve use of a browser or other means, including cellular means, to connect to the online banking services. Once connected to the Web site 22, the media devices 62 and 63 may allow viewing of content such as video programs and static images generated by the video provider 80 and displayed on the Web pages 30 at the Web site 22. The videos and static images may include slots or spaces into which content segments such as advertisements may be placed. When such a video or static image is to be viewed on the media devices 62 or 63, the Web server 24 may send an advertisement (ad) request, which is received at the advertiser 40, and which may be answered with an advertisement 44.

The viewer 66 may access the Web service provider 90 to use a social networking Web site, a blog Web site, including a personal blog Web site and/or a commercial blog Web site, and other Web sites, as is described below with reference to FIG. 2A.

The viewer 66 may operate the media devices 62 and 63 to communicate through the network 50 directly to the analytics service 70. For example, an application on the media device 62 may be a game. The individual game moves (clicks) made by the viewer 66 in playing the game may be sent directly to the analytics service 70 by the media device 62.

The analytics service 70 includes analytics server 72. The analytics service 70 may operate in conjunction with Web site operators to collect, analyze, and report information and data related to visits to Web sites by viewers 66. The analytics service 70 may be part of the video delivery system 20, or the advertiser 40, or may be a separate entity. The analytics service 70 collects, analyzes and reports on data and information related to visits to the Web site 22, operation of applications, and other reported activity. In an embodiment, as is described with respect to FIG. 3, the analytics service 70 may operate system 300 to collect Web site information that may be used to improve serving of content segments in the video delivery system 20.

The video provider 80 provides content, in the form of videos 84, which may be displayed on the Web pages 30 and viewed and/or heard by the viewer 66 using the media devices 62 and 63. In an embodiment, the video provider operates, using Web server 82, video sharing Web site 86, and may embed the videos 84 on the Web site 86.

The Web service provider 90 operates Web sites 200 using Web server 92. The Web sites 200 may include those on which viewer 66 may provide comments, upload videos, and upload images. The Web sites 200 may include social networking Web sites. The Web service provider 90 may operate a Web hosting service, and the Web sites 200 may be personalized for and used by individual, such as the viewer 66. The Web sites 200 will be described in more detail with reference to FIG. 2A.

FIGS. 2A-2D illustrate examples of resources that may be used in the environment of FIG. 1 and on which are embedded videos and/or other content segments.

Figure 2A:
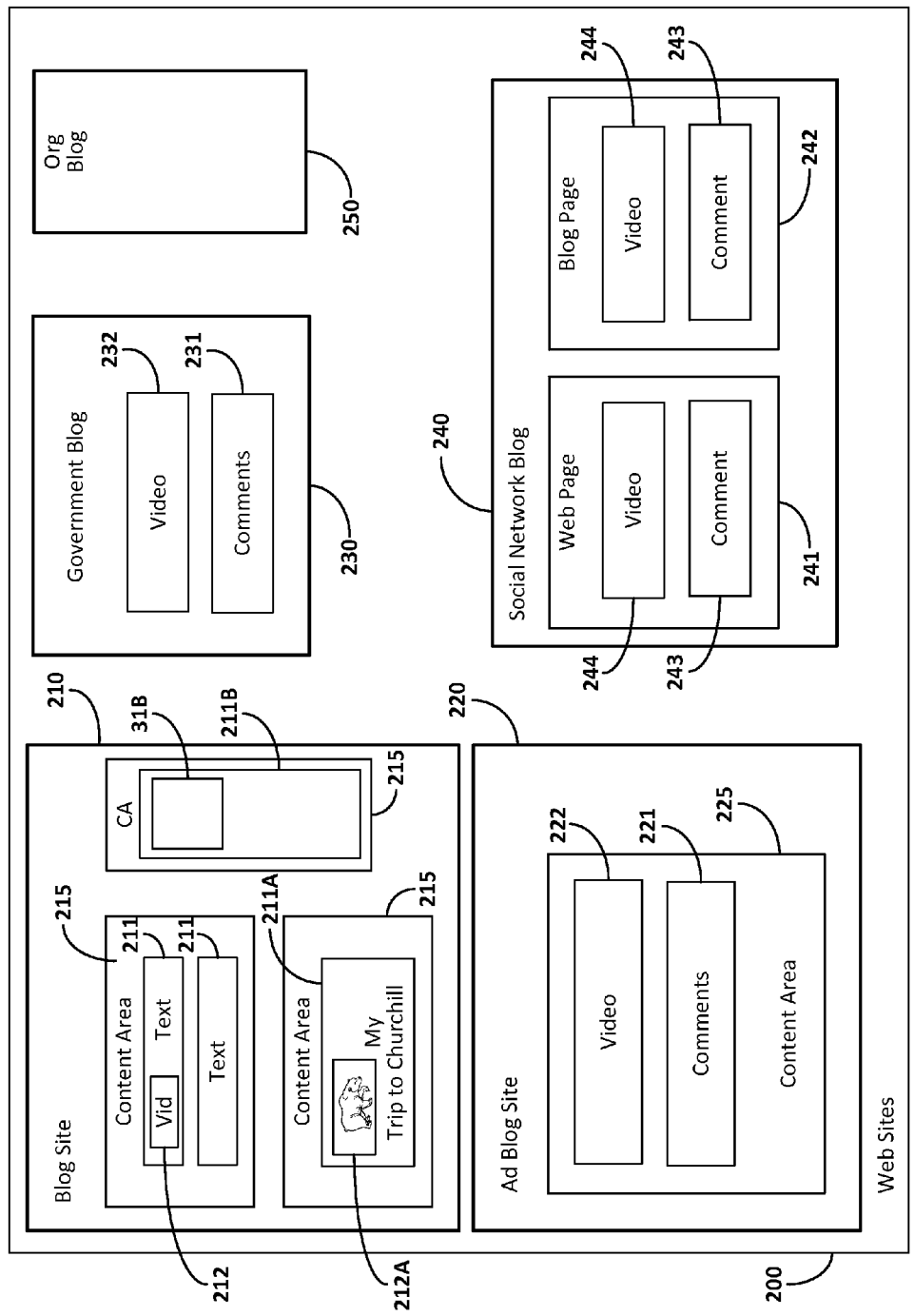
FIGS. 2A-2D illustrate examples of resources that may be used in the environment of FIG. 1 and on which are embedded videos and/or content segments.

FIG. 2A illustrates Web sites 200 operated by Web service provider 90, and corresponding Web pages provided thereon. The Web sites 200 include private blog site 210, advertiser blog site 220, government blog site 230, social network blog site 240, and organizational blog site 250. In an alternative, some of the aforementioned Web sites may be provided by a separate entity; e.g., a government agency may provide its own blog site.

The private blog site 210 may be authored by an individual such as the viewer 66. The private blog site 210 includes one or more content areas 215. One such content area 215 may be used for textual comments 211 that the individual writes and posts a-periodically. The textual comments may, from time to time, include an embedded image or video 212. In an embodiment, the embedded video is a same video as posted by the video delivery system 20. In an example, the individual uploads the video 212 to the video delivery system 20, and also embeds the video 212 on the private blog site 210 along with commentary 211 directed to the video 212. In another example, the individual downloads a video from the video delivery system 20 and embeds the video 212 on the private blog site 210 along with commentary 211 directed to the video 212.

In the example private blog site 210, viewer 66 provides a running commentary about her life experiences and from time-to-time may include a video. For example, the viewer 66 provides blog post 211A about a recent trip to Churchill, Manitoba in November to watch polar bears. The post describes flying to Winnipeg, traveling overland to Churchill, staying for several days, and how awesome it was to see polar bears up close. The viewer 66 embeds a video 212A of the trip with the blog post 211A.

The viewer 66, who obviously has an interest in polar bears, decides to share her polar bear video more widely than might be possible using only her private blog site 210 and thus also uploads the video 212A on a Web page 30 of the video delivery system 20.

When visiting the Web site 22, the viewer 66 sees a nature video 31B (see FIG. 2B) about polar bears. The viewer 66 copies the video 31B and embeds the video 31B on her personal blog site 210 along with blog post 211B about polar bears and her recent trip to Churchill. In an embodiment, when the viewer 66 copies the video 31B, code segments that are used to display the video 31B on Web page 30A (see FIG. 2B).

The advertiser blog site 220 may be generated and maintained by a commercial entity such as an automobile company. The blog site 220 may be intended to promote and generate brand recognition for the company's automobiles. The blog site 220 may encourage discussion (blogging) related to the company's automobiles. The advertiser blog site 220 may include one or more videos 222 showing the company's automobiles in operation, and may invite comments 221 from the viewing public. The videos and comments may be provided in content area 225. The same videos 222 may appear on Web sites 22 operated by the video delivery system 20.

The government blog site 230 may be operated by a Federal, state, or local government agency and may include information related to that agency. Part of the information may include videos 232. The viewing public may be invited to post comments (blogging) 231 related to any aspect of the government entity's activities, including the content of the videos 232. The videos 232 also may appear on a Web site 22 of the video delivery system 20.

The social network blog site 240 may be implemented on individual Web pages 241 of members of the social network. Alternately, the social network may maintain a separate blog page 242. In either alternative, members of the social network may be able to post comments (blogging) 243 on the Web pages 241 or the blog page 242, and also may be able to embed videos 244 on either the Web pages 241 or the blog page 242. The videos 244 also may appear on a Web site 22 of the video delivery system 20.

The organizational blog site 250 may be operated by a non-government agency, such as, for example, a polar bear watchers club.

Figure 2B:
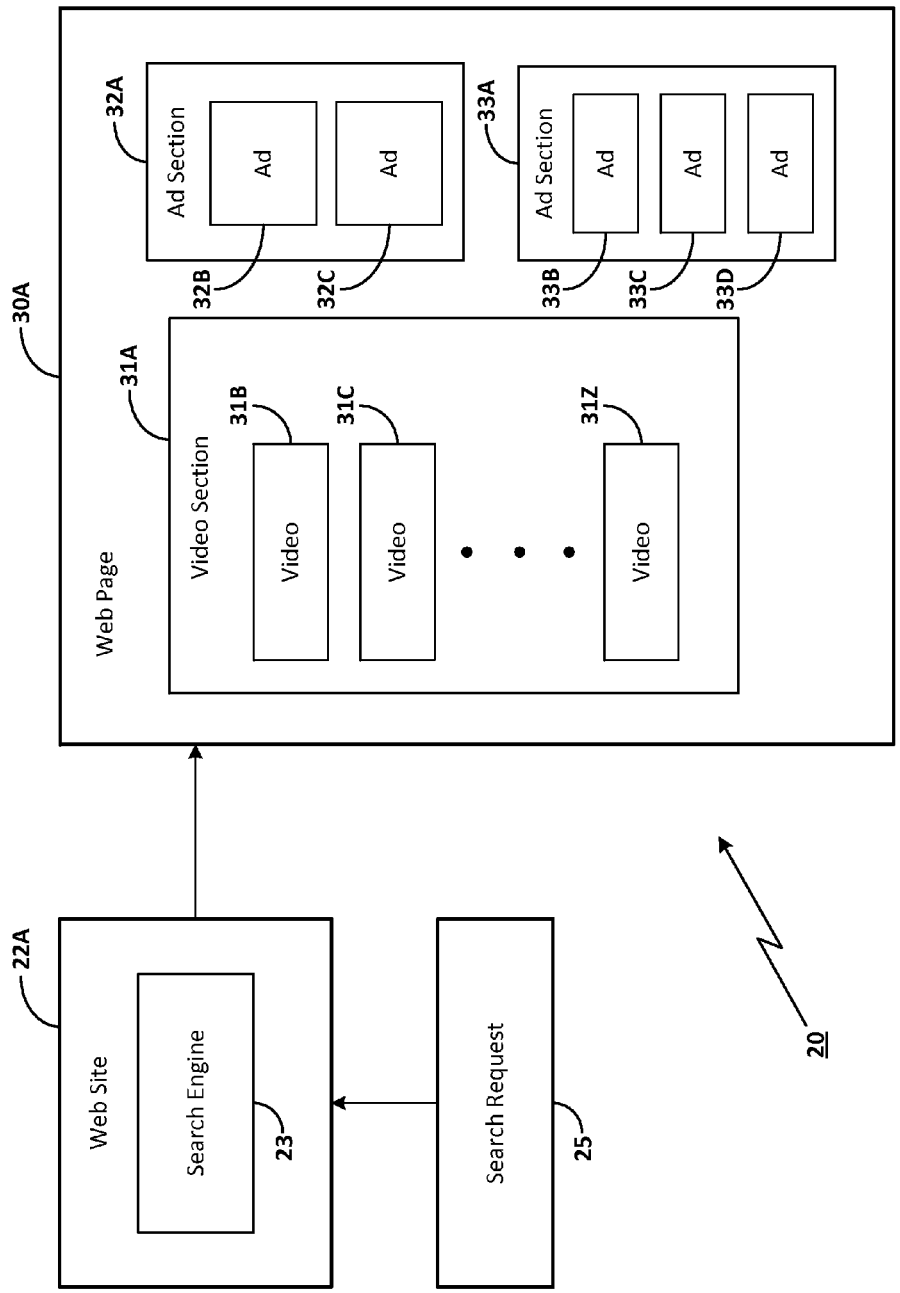

FIG. 2B illustrates an example of a Web site and corresponding Web page provided by the video delivery system 20. In FIG. 2B, Web site 22A provides a search engine feature in which search engine 23 receives search requests 25 from the viewer 66 and provides search results on search results Web page 30A. In the illustrated example, Web page 30A provides search results for a search request to display videos for Arctic life, including trailers for recently-released nature movies about life in the Arctic. Web page 30A includes video section 31A in which videos 31B-31Z are embedded, ad section 32A in which advertisements 32B and 32C are provided, and ad section 33A in which advertisements 33B-33D are provided. The videos 31B-31Z are selected by search engine 23 to match the criteria specified in the search request 25. In the example of FIG. 2B, the search request 25 is provided by viewer 66 and the query is for Arctic life. Thus, for example, video 31A is a short nature video about polar bears. The advertisements 32B and 32C are video advertisements. Each video 31B-31Z may have a unique identification (ID) assigned. Each video 31B-31Z may have defined a set of metadata, and the set of metadata may be stored in a database of the video delivery system indexed by the unique ID, for example. Each video 31B-31Z is embedded using a specific embedding mechanism, which may be a defined HTML code snippet. The advertisements 33B-33D include video and static advertisements. In the illustrated example of FIG. 2B, all of the advertisements may relate to nature topics, such as advertisements for outdoor clothing, camping, tours, and similar products and services. The advertisements also may include movie trailers for upcoming movies about nature, life in the Arctic, and similar themed entertainment.

To embed the video from a web page 30, a viewer 66 or blogger need only copy a code snippet associated with a video displayed on one of the Web pages 30. In an embodiment, copying the video also copies the code snippet needed to embed the video with a blog post. Alternately, the viewer 66 may provide the code snippet.

Figure 2C:
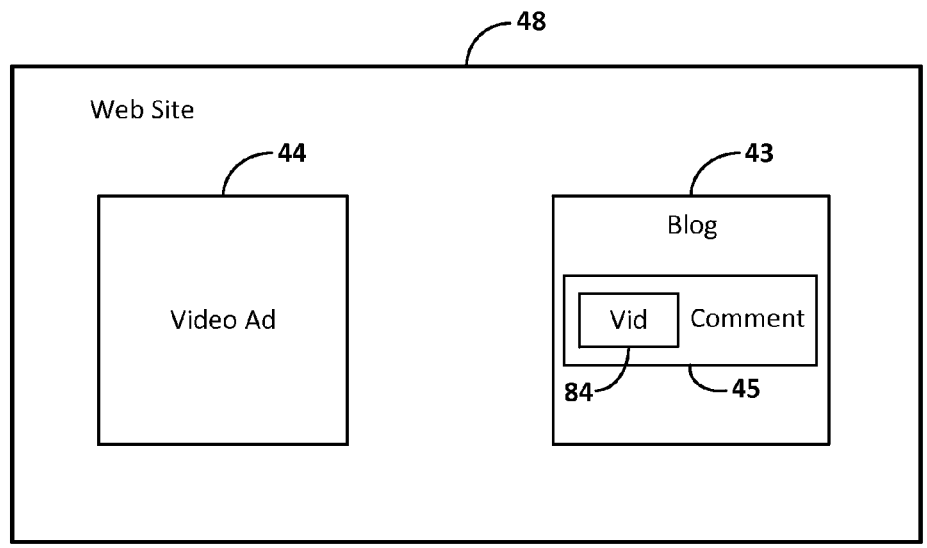

FIG. 2C illustrates an example of Web site 48 provided by advertiser 40. The Web site 48 differs from the advertiser blog site 220 (see FIG. 2A) in that it is primarily intended to advertise a product and service, and optionally provide a mechanism for purchasing a product or service or acquiring additional information about a product or service, for example. However, the Web site 48 may include blog 43 that allows a Web site visitor to post comments 45 about the advertised products and services. In an embodiment, the Web site 48 allows visitors 66 to the Web site 48 to embed a video with the posted comment 45.

Figure 2D:
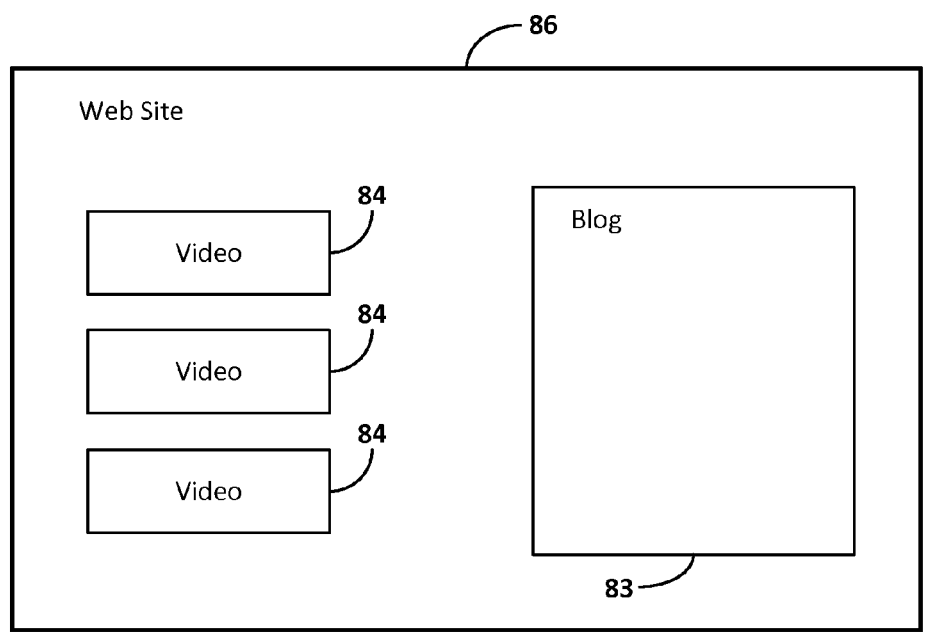

FIG. 2D illustrates an example of Web site 86 provided by video provider 80. The Web site 86 includes a number of videos 84 that may be accessed by a subscriber such as the viewer 66. That is, access to the videos 84 may require payment of a subscription fee. The videos 84 may include full episodes of broadcast television shows, movie trailers, news clips, sports clips, nature videos about polar bears, and other videos. One or more of the videos 84 may correspond to videos posted at the video Web site 22. The videos may be exact (i.e., have the same unique ID) or may be related (e.g., two different movie trailers for the same polar bear movie). In an embodiment, the video provider 80 may provide a definite linking mechanism to relate two or more videos. For example, two unique IDs may be linked. The Web site 86 also may provide a blog, comment section, discussion board, or billboard 83 where subscribers can provide comments related to a specific video. The blog 83 may be provided through a link to a blog page, which is different from the Web page displaying the videos 84.

Figure 3:
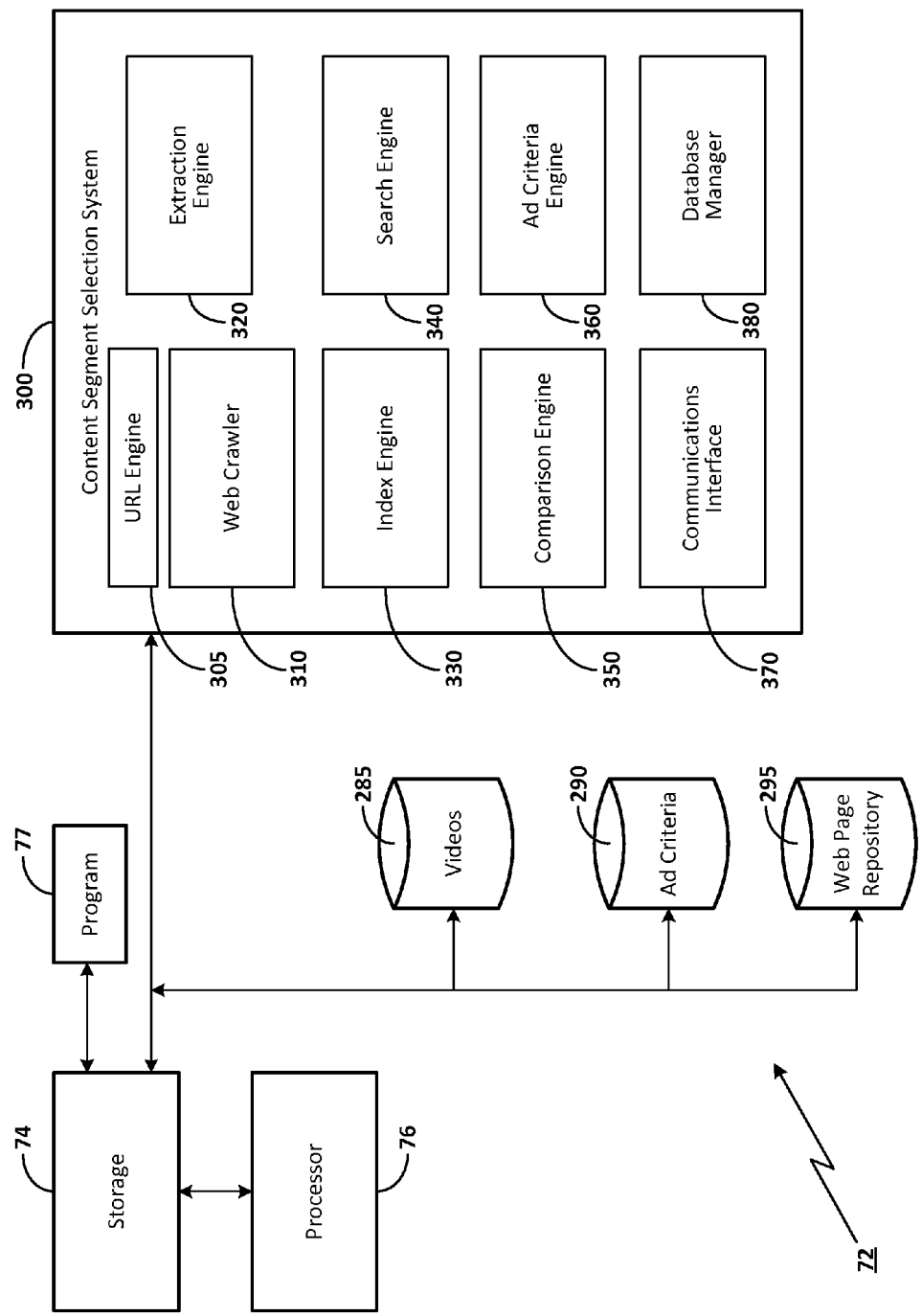
FIG. 3 illustrates an example system for improving the contextual serving of content segments in a video delivery system.

FIG. 3 illustrates an example system for the contextual serving of content segments in a video delivery system. In an embodiment, content segment selection system 300 is operated by the analytics service 70 of FIG. 1. More specifically, FIG. 3 illustrates the system 300 implemented on analytics server 72.

The analytics server 72 communicates with external entities using the communications network 50. The analytics server 72 includes a computer-readable storage medium 74 on which is encoded the machine instructions comprising the system 300, and processor 76 that executes the machine instructions, and other programming 77 needed to provide the services of the analytics service 70.

The system 300 includes URL engine 305 and at least one Web crawler 310 for traversing and retrieving Web pages from Web sites coupled to the communications network 50. Because of the proliferation of Web sites, the system 300 may include many separate Web crawlers 310. The system 300 further includes extraction engine 320, index engine 330, search engine 340, comparison engine 350, advertisement criteria engine 360, communications interface 370, and database manager 380. The system 300, and more specifically the database manager 380, may store data in and retrieve data from video database 285, advertisement criteria database 290, and Web page repository 295. In an embodiment, the search engine 340 may include the Web crawler 310, extraction engine 320, and index engine 330. In an embodiment, the system 300 may include many different Web crawlers 310 and index engines 320.

The URL engine 305 selects URLs for crawling by the Web crawler 310. The URL engine 305 may provide the URLs in a ranked order. The URL engine 305 may use a page ranking algorithm to rank the URLs. For example, the URL engine 305 may rank URLs based on the number of links to s specific Web page. The URL engine 305 may employ other mechanisms for selecting URLs to be visited by the Web crawler 310. In an embodiment, the URL engine 305 selects URLs for Web pages that contain blogs, comment sections, bulletin boards, and billboards. In a further refinement of a URL listing, the URL engine 305 may select URLs for those Web pages known to allow embedding of videos. The URL engine may determine if a Web page allows video embedding based on historical data collected from that Web page, or from cascading style sheet (CSS) information for that Web page.

The Web crawler 310 retrieves content, metadata, cascading style sheet (CSS) information, and other data on or associated with the Web pages. Content refers to text, images, videos and other information visible to the viewer 66 that is placed or loaded on the Web page. Content may include advertisements, promotions, coupons, and other data intended to advertise or call attention to a product or service. Metadata may not be visible to the viewer 66 but includes information that relates to the content and to the Web page. For example, an embedded video may have a unique identification (ID) that is included with the Web page as metadata. CSSs include rules governing how a document such as a Web page is presented on a Web browser running on a media device (e.g., media device 62). CSSs may define fonts, colors, margins, lines, height, width, alignment and positioning, and background images.

The Web crawler 310 may continually traverse the Internet to identify and copy Web pages such as those shown in the environment 10 of FIG. 1. The Web crawler 310 may identify a candidate Web page based on detecting tags that are used to embed videos. Given the enormous number of Web sites, the Web crawler 310 may include programming to limit the crawling to blogs only. However, the Web crawler 310 need not be limited to crawling only blogs, and may crawl other Web sites that include comments sections, blogs, bulletin boards, and other mechanisms that allow viewers 66 to post comments and to embed videos. Thus, the Web crawler 310 is not limited to the collection of this information and data, and is capable of retrieving a broad range of content, including any readable and/or storable content.

The extraction engine 320 extracts information from each Web page in repository 295. The extraction engine 320 scans a Web page and extracts information contextually relevant to content published in one or more Web page content areas. In an embodiment, the extraction engine 320 extracts information contained in blog posts having an associated video embedded with the blog post. In this embodiment, the extraction engine 320 may limit the extraction process to only those blog posts having a video embedded using the same embedding technique or code segment used to embed videos on the Web page 30. Alternately, the extraction engine 320 may scan videos posted on the Web page 30 to first determine the identification (ID) of the video. The extraction engine 320 may proceed with the extraction process when the ID matches an identification stored in the video database 385 (see discussion below). This matching process may be executed by the comparison engine 350, which receives the determined ID from the extraction engine 320 and reports to the extraction engine 320 when a match is determined. Content may include published information, such as articles, and/or other data of interest to users, often displayed in a variety of formats, such as text, video, audio, hyperlinks, or other known formats.

The extraction engine 320 may employ various techniques for extracting the content including, for example, machine learning models, and semantic and/or statistical based algorithms. The content may include keywords, and the keywords may be extracted according to weighted values assigned to each keyword. For each content area, for example, the extraction engine 320 may assign a value to a keyword based on parameters such as the frequency the keyword appears within the content area, the location of the keyword, the formatting style (e.g., font, alignment, color, size, etc.) of the keyword. Alternately, the video program operator may provide a list of keywords to search for in the content segment.

The extraction engine 320 also may extract metadata related to a video or to a blog. For example, a video that has multiple comments on the same blog page may be weighted because of its "popularity." Some blog posts allow other bloggers to indicate a like or dislike of the blogs, and the number of likes and dislikes may be extracted by the extraction engine 320.

The index engine 330 indexes the stored Web pages into one or more search indexes associated with a search engine 340. For instance, the index engine 330 may initially separate and analyze various components of the content segment such as embedded links, text, formal names, and metadata. The Web pages may be subsequently indexed in the search indexes according to one or more of the foregoing components. In an embodiment, the index engine 330 indexes the Web pages into the search indexes according to the keywords extracted from each Web page. Thus, in this embodiment, each Web page stored in the search indexes includes a pre-extracted set of keywords corresponding to the content area(s) associated with that Web page.

The search engine 340 may include the Web crawler 310 and index engine 320. In an embodiment, the search engine 340 operates the Web crawler 310 to search specific Web sites to find content related to videos displayed on the video Web pages 30. For example, the search engine 340 searches the Internet for Web sites having blog posts. Some such Web sites are exclusively directed to blogging. Other Web sites incorporate blog posts or comments sections as one of their features. The search engine 340 also may be used to search the video database 285 to support generating advertisement criteria.

The comparison engine 350 compares content extracted by the extraction engine 320 and indexed by the index engine 330 to a set of criteria for advertisement segments that may be served in the Web pages 30 as appropriate to the videos. The comparison engine 350 may determine that none of the information extracted by the extraction engine may be useful for improving the contextual-based serving of content segments in the video delivery system 20, or may identify a set of appropriate advertisements, or types of advertisements. For example, the comparison engine 350 may determine that advertisements for outdoor clothing would be appropriate for videos directed to viewing polar bears in Churchill, Manitoba.

The advertisement criteria engine 360 determines a set of criteria for selecting advertisements appropriate for display on the Web pages 30. That is, the engine 360 examines the collected information extracted from the blog posts and establishes for each video posted on the Web pages 30, a set of criteria for advertisements that most likely will result in the highest advertisement revenue for the Web page 30. Alternately, the advertisement criteria may be suggested by the advertiser 40, for example.

The communications interface 370 allows the server 72 to communicate with other devices illustrated, for example, in FIG. 1. For example, the interface 370 communicates information with the Web server 24.

The database manager 380 operates the databases 285 and 290, and the Web page repository 295. For example, the database manager 380 may discard Web pages from the web page repository 295 after contextual information has been harvested from the Web pages.

The video database 285 includes videos (e.g., the videos 31B-31Z of FIG. 2B) that may be displayed by the video delivery system 20. The video database 285 may store the videos 84 based on the unique ID provided for each video. Alternately, the video database 285 does not store the actual video but instead stores the unique identification for the videos with a video file 386. The videos or video files may be grouped by type or theme. The video database 285 also stores, with the video or video file, metadata and extracted contextual information that relates to the videos.

The advertisement criteria database 290 stores advertisement criteria that may be used for indicating the type of advertisement appropriate for a specific video or type of video. For example a type of video may be an outdoor travel video, and the related advertisement criteria may specify outdoor clothing, equipment, off-road vehicles, wilderness resorts, and other products and services that relate to outdoor travel. The database may link all videos that have a type or theme of outdoor travel. A specific video may relate to polar bear watching in Churchill, Manitoba. The polar bear video has its own unique identification. The advertisement criteria for this video may be more specific than that for the more generally type of outdoor travel.

The Web page repository 295 stores Web pages harvested by the Web crawler 310. The repository 295 may maintain the Web pages until their content has been extracted by the extraction engine 320.

The databases 285 and 290, and the Web page repository 295, may be implemented as any type of data storage structure capable of providing for the retrieval and storage of a variety of data types. For instance, the databases 285 and 290, and the Web repository 295 may be implemented as one or more accessible memory structures such as a database, CD-ROM, tape, digital storage library, flash drive, floppy disk, optical disk, magnetic-optical disk, erasable programmable read-only memory (EPROM), random access memory (RAM), and magnetic or optical cards.

FIGS. 4A-4D illustrate example methods to improve the contextual serving of content segments in a video delivery system. FIGS. 4A-4D are based on the systems and Web sites shown in FIGS. 1-3.

Figure 4A:
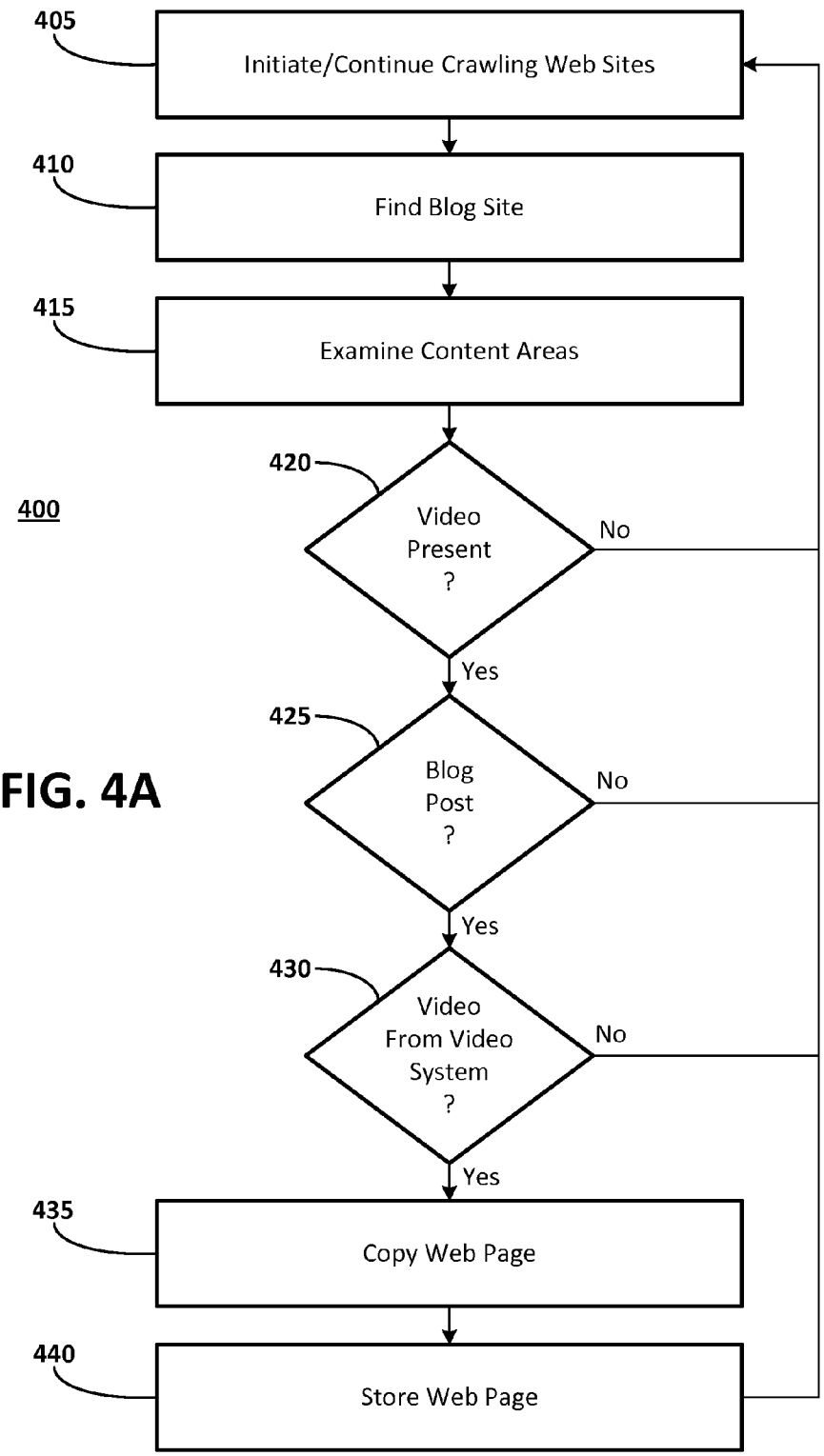
FIGS. 4A-4D illustrate example methods to improve the contextual serving of content segments in a video delivery system.

In FIG. 4A, Web crawling method 400 begins in block 405 when the Web crawler 310 begins crawling Web sites on the Internet. In an embodiment, the Web crawler 310 may begin by moving to a Web site known to be or to incorporate a blog. Alternately, the Web crawler 310 may begin at any seed Web site.

In block 410, the Web crawler 310 arrives at a Web site containing a blog. In block 415, the Web crawler 310 examines the content segments in the various content areas of the Web page. In block 420, the Web crawler 310 determines if any videos are present in any of the content areas of the Web page. If the Web crawler 310 determines a video is present, the method 400 moves to block 425 and the Web crawler 310 determines if there are any comments (blog posts) associated with the video. If there video is accompanied by comments, in block 430, the Web crawler 310 determines if the video is from the video delivery system. In an embodiment, the Web crawler 310 makes this determination by identifying tags associated with the video, where the tags correspond to tags provided with the code segment used to embed the video in the Web page 30. Since copying the video to the blog, in an embodiment, copies the tags, the presence of the tags with the video on the blog is a good indication that the video was copied from the Web page 30. Thus, the net result of the processing of blocks 420, 425, and 430 is to identify a blog having an embedded video copied from the Web page 30. If in any of blocks 420, 425, or 430 the Web crawler 310 determines the stated condition is not met, the method 400 returns to block 405, and the Web crawler 310 continues with the Web crawling process. In an embodiment, the Web crawler 310 moves to a Web page identified by a link in the Web page currently being visited. If no such link is available, the Web crawler 310 moves to a next blog site that has been identified previously.

In block 435, the Web crawler 310 copies the Web page just crawled, and in block 440 stores the Web page copy in the Web page repository 295. The method 400 then returns to block 405, and the Web crawler 310 continues the Web crawling process.

Note that the method 400 may execute continuously. That is, the Web crawler 310 may continuously crawl the Internet looking for Web pages having blogs with embedded videos.

Once the Web crawler 310 has copied a Web page, the Web crawler 310 may mark the Web page as copied so as to not return to that Web page absent a change to its content or the passage of a specified time increment. Other re-visit policies may be implemented in the system 300. Also note that while the Web crawler 310 executes a focused crawl looking for blog sites or Web sites containing blogs, comment sections, billboards and discussion boards, the Web crawler may be programmed to visit other types of Web sites.

Figure 4B:
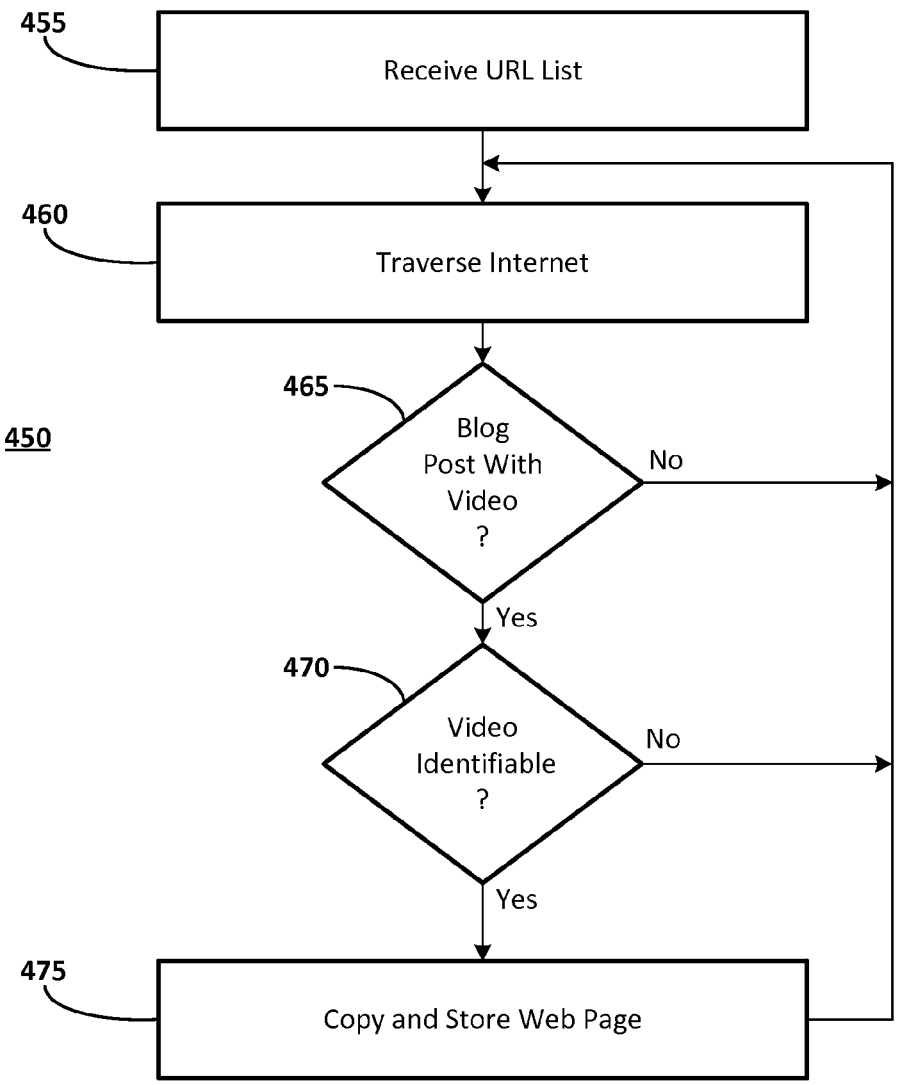

FIG. 4B is a block diagram of alternative Web crawling method 450. In block 455, the Web crawler 310 receives a list of URLs for blog sites. In block 460, the Web crawler 310 begins by traversing to a Web site having a first URL. The first URL may be chosen by use of a page ranking scheme where the first URL has the highest page rank. Page rank may be assigned by a separate server, and may be based on the number of visits received by the associated Web site, the number of comments posted, the number of links to and from the Web site, and other criteria. In an embodiment, the URL engine 305 executes algorithms and processes to select candidate URLs for crawling, and may present the URLs to the Web crawler 310 in the order of their ranking from highest rank to lowest rank.

In block 465, the Web crawler 310 determines if the Web page corresponding to the chosen URL includes a comment or blog having an embedded video. If in block 465, no comment or blog having an embedded video is identified, the method 450 returns to block 460. If a comment of blog having an embedded video is identified in block 465, the method 450 moves to block 470. In block 470, the Web crawler 310 determines if the video is identifiable. If the video is not identifiable, the method 450 returns to block 460. If the video is identifiable in block 470, the method 450 moves to block 475. In block 475, the Web crawler 310 copies and stores the Web page into the Web page repository 295. The method 450 then returns to block 460. Upon return to block 460, the Web crawler 310 selects the next highest ranked URL for crawling. The method 450 may proceed through as many iterations as there are URLs in the URL list. Note that the system 300 may employ many separate Web crawlers 310 when executing the method 450.

Figure 4C:
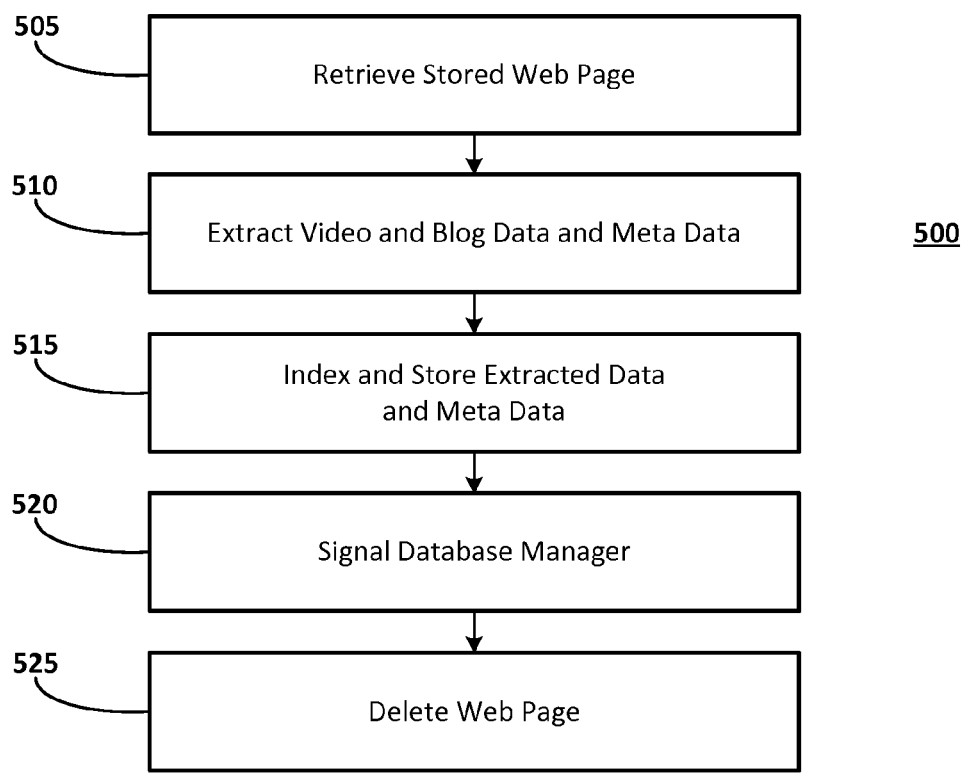

FIG. 4C illustrates an example method for extracting contextually-relevant information from a Web page identified and stored by the Web crawler 310. In FIG. 4C, method 500 begins in block 505 when the search engine 340 retrieves Web pages from the Web page repository 295. In block 510, the extraction engine 320 extracts video information such as a unique video ID, metadata associated with the video (e.g., date of uploading to the Web page), and data and information in the blog post accompanying the embedded video. The extraction engine 320 may extract keywords from the blog post. The key words may be provided by the creator of the video. The keywords may be derived from previous blog posts associated with the same video. The keywords may be extracted based on algorithms that are written to search for proper nouns, verbs, adverbs and other parts of speech. Other techniques may be used to extract keywords from the blog post. In block 515, the extraction engine 320 stores the extracted data and information in the video database 285. In block 520, the extraction engine 320 signals the database manager 380 to delete the Web page. In block 525, the database manager deletes the Web page from the Web page repository 295 and records a line item indicating the Web page was stored, processed to extract data, and then deleted. In this way, the database manager 380 maintains a history of Web sites visited by the Web crawler 310.

Furthermore, the extraction engine 320 may use self-learning techniques or associative techniques to search for keywords. That is, the extraction engine 320 may detect certain words or phrases as occurring repetitively in blog posts, and may determine these words and phrases are appropriate to retain as keywords for searching.

In an example, assume a Web page 30 includes nature videos about polar bears. A viewer 66, who is a dedicated adventurer, recently returned from a trip to Churchill, Manitoba to watch polar bears. The viewer 66 may write a blog post and embed the video in the blog post. Alternately, the viewer 66 may take a video of the polar bear watching on a Web page 30. The blog post may describe the experience and provide suggestions for others who might consider the trip to Churchill. The producer of the polar bear video may provide the analytics service 70 with certain key words that are relevant to polar bears, such as "Churchill, Manitoba"; "polar bear tours"; "polar bear watching"; and "largest animal in the Western Hemisphere." Since the topics of the nature video and the polar bear tour video are related, the same keywords may be appropriate for blog posts that embed either video. Furthermore, as blog posts are harvested, the extraction engine 320 may "learn" other keywords for the harvested comments.

Figure 4D:
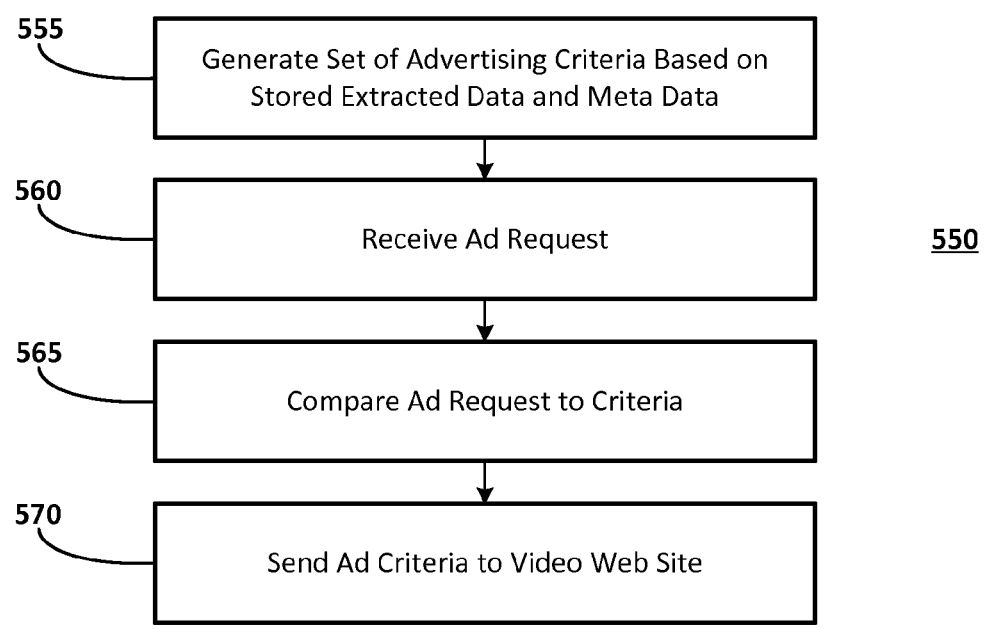

FIG. 4D illustrates an example method for setting advertisement criteria and selecting an advertisement to serve on a video delivery system Web page based on the criteria. In FIG. 4D, method 550 begins in block 555 when the ad criteria engine 360 reviews the data extracted by the extraction engine 320 and stored in the video database 285 to generate a suggested set of advertising criteria. For example, a video that shows polar bear watching in Churchill, Manitoba, Canada may be accompanied by keywords or phrases such as "best place to stay in Churchill is the Tundra Inn"; "best time of year for polar bear watching is November"; "plan in advance—tours fill quickly"; "stay at least three days in Churchill—bears do not always cooperate"; "dress warmly"; "flew into Winnipeg." A corresponding set of advertisements that may be appropriate to serve at the Web page 30 might include advertisements for polar bear tour companies, airlines that fly to Winnipeg, outdoor clothing stores; accommodations in Winnipeg and Churchill; other activities in Churchill; sights to see in Winnipeg; and a POLAR BEAR WATCHERS club. Furthermore, the ad criteria engine 360 might suggest the ads are best served from June-October in a given year. Similarly, a nature video dedicated to polar bears might be embedded in a blog post about an awesome trip to Churchill to watch polar bears in November. For this video, the ad criteria engine 360 might suggest advertisements for polar bear watching tours in Churchill. The ad criteria engine 360 then stores the set of advertisement criteria in the video database 285 indexed to the corresponding video. The ad criteria engine 360 may periodically refine the set of advertisement criteria as more blog posts are harvested.

In block 560, the system 300 receives a request for advertisement criteria to associate with a video to be displayed on the Web site 22. The request may identify the video by its unique ID. In block 565, the comparison engine 350 compares the data contained in the ad request to the indexed extracted data and meta data contained in the video database 285, and retrieves the set of advertising criteria developed by the ad criteria engine 360. The comparison engine 350, through the communications interface, then sends the set of advertising criteria to the Web server 24. In an alternative, the system 300 may communicate with the ad server 42 to receive ad request information and supply the set of advertisement criteria. In an embodiment, the request from and response to the Web server 24 may occur in real time as the viewer 66 accesses the Web site 22 to request a search for videos. Alternately, the request and response may occur "offline," for example, daily, and without regard to a specific video search request from the viewer 66.

Certain of the devices shown in the herein described figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying description to illustrate the embodiments represented in FIGS. 4A-4D. The disclosed devices, components, and systems contemplate using or implementing any suitable technique for performing the steps illustrated. Thus, FIGS. 4A-4D are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

We claim:

1. A method implemented on a processor for providing content segments to a first resource having a first video, the method comprising:
    systematically browsing, using the processor, one or more second resources hosting a plurality of online documents, the one or more second resources unaffiliated with the first resource;
    identifying, using the processor, the first video embedded in an online document of the plurality of online documents;
    extracting, using the processor, contextual information from the online document;
    generating, using the processor, a set of criteria based on the extracted contextual information;
    receiving, by the processor from the first resource, a request for a content segment;
    selecting, using the processor, a responsive content segment based on the set of criteria; and
    providing, using the processor to the first resource, the responsive content segment to be displayed with the first video.

2. The method of claim 1, further comprising:
    copying and storing, using the processor, the online document embedding the first video.

3. The method of claim 1, wherein identifying the first video comprises detecting code segments used to embed the first video.

4. The method of claim 3, wherein the code segments used to embed the first video are identical to code segments used to embed the first video at the first resource.

5. The method of claim 1, wherein extracting the contextual information comprises extracting keywords and phrases provided in a comment associated with the first video.

6. The method of claim 5, wherein the one or more second resources are blog sites, and wherein the comment is provided as a blog post at a blog site of the blog sites.

7. The method of claim 5, wherein the one or more second resources are Web pages, and wherein the Web pages comprise blog sections.

8. The method of claim 1, wherein the responsive content segment is an advertisement.

9. The method of claim 1, further comprising:
    extracting, by the processor, a video identification from the first video embedded in a second resource of the one or more second resources;
    comparing, by the processor, the video identification with a corresponding video identification of the first video displayed at the first resource; and
    when the video identification matches the corresponding video identification, serving the responsive content segment.

10. A system for providing content segments to a first resource having a first video, comprising:
    a processor; and
    a computer-readable storage medium having encoded thereon a program of instructions executed by the processor, wherein the processor:
        systematically browses one or more second resources hosting a plurality of online documents, the one or more second resources unaffiliated with the first resource;
        identifies the first video embedded in an online document of the plurality of online documents;
        extracts contextual information from the online document;
        generates a set of criteria based on the extracted contextual information;
        receives a request for a content segment from the first resource;
        selects a responsive content segment based on the set of criteria; and
        provides to the first resource the responsive content segment to be displayed with the first video.

11. The system of claim 10, wherein the processor further:
    copies and stores the online document embedding the first video.

12. The system of claim 10, the processor identifying the first video one or more second resources by detecting code segments used to embed the first video.

13. The system of claim 10, wherein when extracting the contextual information, the processor extracts keywords and phrases provided in a comment associated with the first video.

14. The system of claim 13, wherein the one or more second resources are blog sites, and wherein the comment is provided as a blog post at a blog site.

15. The system of claim 12, wherein the code segments used to embed the first video are identical to code segments used to embed the first video at the first resource.

16. The system of claim 13, wherein the one or more second resources are Web pages, and wherein the Web pages comprise blog sections.

17. The system of claim 10, wherein the responsive content segment is an advertisement.

18. The system of claim 10, wherein the processor further:
    extracts a video identification from the first video embedded in a second resource of the one or more second resources;
    compares the video identification with a corresponding video identification of the first video displayed at the first resource; and
    when the video identification matches the corresponding video identification, serves the responsive content segment.

19. A processor-implemented method for improving serving of content segments at a first resource having a first video, the method comprising:

using the processor:
- systematically browsing one or more second resources including comments with embedded videos, the second resources unaffiliated with the first resource;
- identifying a second video embedded in a comment, the second video corresponding to the first video displayed at the first resource;
- extracting contextual information from the comment;
- generating a set of criteria based on the contextual information;
- receiving a request for a content segment;
- selecting one or more content segments based on the set of criteria; and
- serving a content segment of the one or more content segments with a display of the first video at the first resource.

20. The method of claim 19, further comprising identifying the one or more second resources for systematically browsing, comprising:
- detecting code segments used to embed the embedded videos in the one or more second resources, wherein the code segments correspond to code segments used to display the first video in the first resource.

\* \* \* \* \*